United States Patent van den Nieuwelaar et al.

[11] Patent Number: 5,334,083
[45] Date of Patent: Aug. 2, 1994

[54] METHOD AND DEVICE FOR MECHANICALLY DRAWING SLAUGHTERED POULTRY

[75] Inventors: Adrianus J. van den Nieuwelaar, Gemert; Cornelis D. van Harskamp, Boxmeer, both of Netherlands

[73] Assignee: Stork PMT, Boxmeer, Netherlands

[21] Appl. No.: 879,757

[22] Filed: May 6, 1992

[30] Foreign Application Priority Data

May 8, 1991 [NL] Netherlands ............... 9100804

[51] Int. Cl.⁵ ............................................ A22C 21/00
[52] U.S. Cl. ........................ 452/106; 452/109; 452/117
[58] Field of Search ............... 452/106, 109, 116, 117, 452/118, 178, 179

[56] References Cited

U.S. PATENT DOCUMENTS

| | | | |
|---|---|---|---|
| 3,474,492 | 10/1969 | Viscolosi | 17/45 |
| 3,663,991 | 5/1972 | Harben, Jr. | 17/11 |
| 4,283,813 | 8/1981 | House | 17/11 |
| 4,677,709 | 7/1987 | Dixon | 17/11 |
| 5,026,317 | 6/1991 | Kennedy | 452/106 |
| 5,098,333 | 3/1992 | Cobb | 452/106 |

FOREIGN PATENT DOCUMENTS

| | | |
|---|---|---|
| 7017907 | 6/1971 | Netherlands . |
| 7205388 | 7/1973 | Netherlands . |
| 7300546 | 7/1973 | Netherlands . |
| 7310913 | 2/1975 | Netherlands . |
| 1378411 | 12/1974 | United Kingdom . |

*Primary Examiner*—Willis Little
*Attorney, Agent, or Firm*—Deveau, Colton & Marquis

[57] ABSTRACT

Method and device for mechanical removal of the viscera package from the belly cavity of slaughtered poultry hanging by the legs from hooks which are moved in a conveyor along a drawing device. For removal of the viscera package, the body of the poultry is tilted from the hanging, vertical position through a predetermined angle about an axis parallel to a line through the hip joints to a second position, in which the shoulder joints are situated at essentially the same height as or higher up than the hip joints. The latter body position thereafter remains retained during the veterinary inspection of the poultry or the carrying out of further operations on the viscera package and/or the carcass. The second position of the body is preferably produced by guiding at least a part of the neck of the poultry from a position lower down than the legs to a position in which the neck is situated essentially at the same height as or higher up than the legs, and the body of the poultry extends between the neck and the legs.

15 Claims, 6 Drawing Sheets

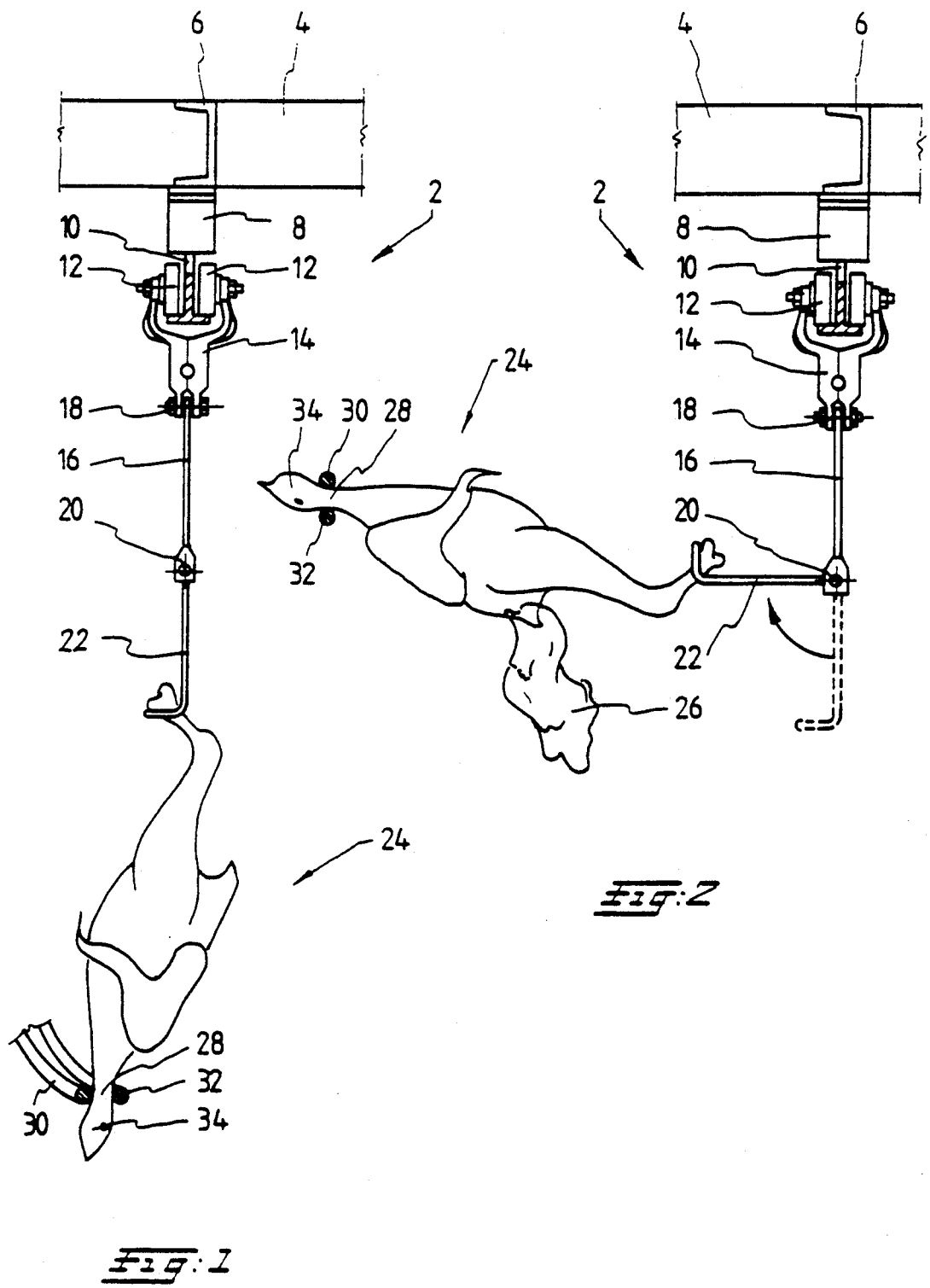

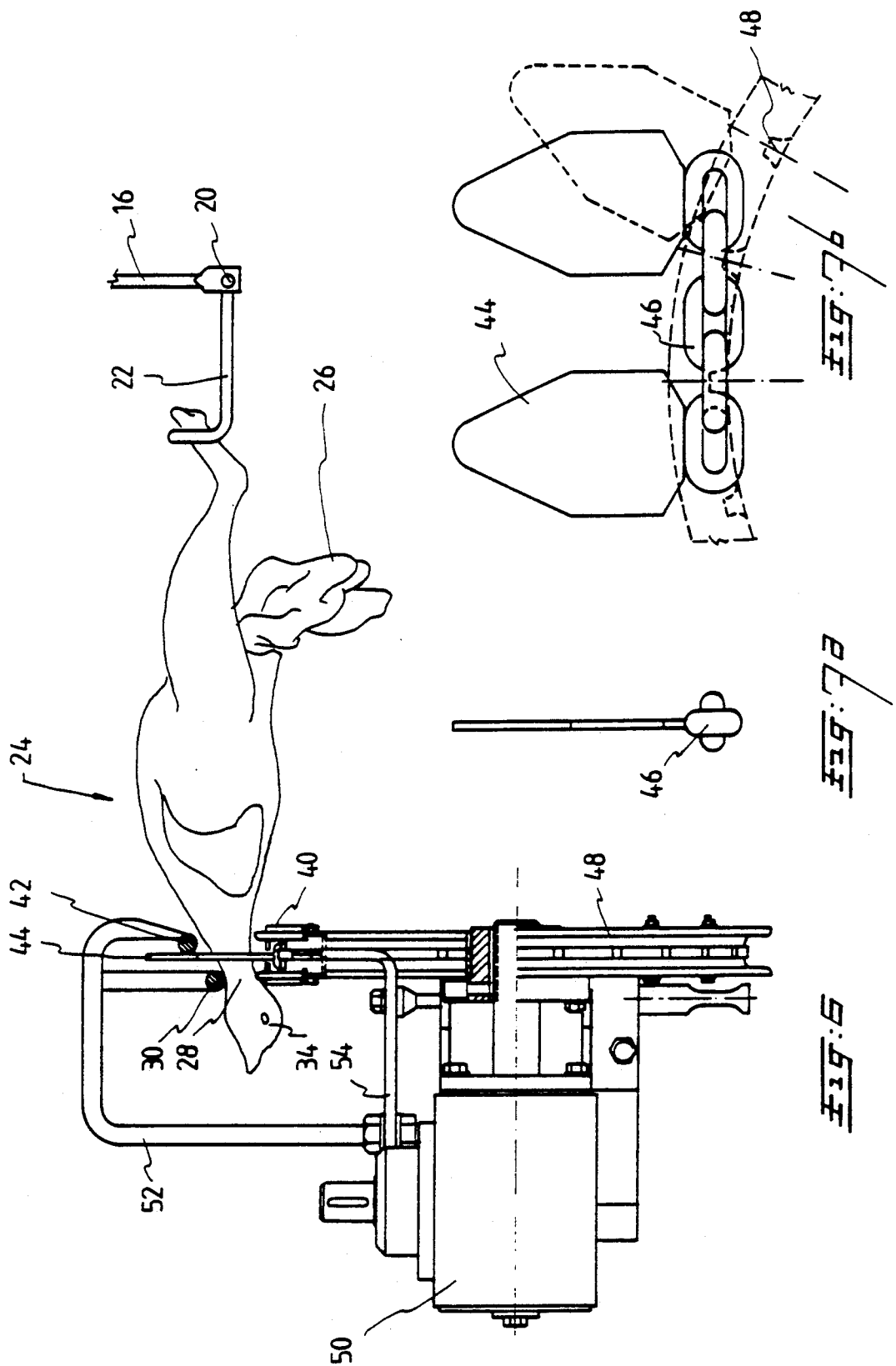

METHOD AND DEVICE FOR MECHANICALLY DRAWING SLAUGHTERED POULTRY

BACKGROUND OF THE INVENTION

This invention relates to a method for mechanical removal of the viscera from the belly cavity of slaughtered poultry hanging by the legs from hooks which are moved in a conveyor along a drawing device, for removal of the viscera the body of the poultry being tilted from the hanging, vertical position through a predetermined angle about an axis essentially parallel to a line through the hip joints. The invention also relates to a device for carrying out the above-mentioned method, in which the birds hanging from the hooks of the conveyor are moved along a drawing device.

DISCUSSION OF THE PRIOR ART

Methods and devices for mechanically drawing poultry are known in many variants, and their purpose is to remove the viscera package comprising intestines, stomach, heart, liver, lungs, etc., from the body of slaughtered poultry in its entirety through an opening made near the vent of the poultry using a suitable, generally spoon-shaped drawing tool. The viscera in this case remain connected at certain points to the belly cavity, and, after the drawing operation, consequently hang outside the body against the trunk of the poultry, generally at the back thereof. The viscera hanging from the carcass can then be inspected visually by a veterinary inspector by conveying the poultry past the inspector, in the course of which the inspector can assess the state of health of the slaughtered poultry from the appearance of the viscera, the appearance of the wall of the belly cavity and the external appearance of the carcass. In this way any sick birds with a correspondingly poor product quality can be withdrawn in time from the slaughter process. Other operations which can be carried out immediately after drawing of the poultry are, for example, cleaning of the viscera or removal of one or more organs from the viscera.

Dutch Patent Application No. 7,017,907, which corresponds to U.S. Pat. No. 3,685,096, describes a drawing device for slaughtered poultry in which the drawing tools move, in a fixed position relative to the path of conveyance, along with the poultry hanging with the legs after one another, viewed in the direction of conveyance, by the tarsal joints from hooks which are movable upwards. The drawing operation is carried out by moving the birds on the hooks upwards relative to the corresponding drawing tools and in the process swinging the carcass laterally through a small angle in such a way that a scooping movement is made in the corresponding carcass by each drawing tool. These swinging movements are limited and are intended for allowing the drawing tools to scrape away and scoop out the viscera as well as possible.

The poultry are swung by conveying the heads between parts of belts or the like moving in synchronism with the conveyor, which belts guide away the head laterally from the original path thereof below the conveyor.

After the removal of the viscera from the body of the poultry, the head is no longer guided, and the viscera fall on the back of the poultry hanging head down.

The vertical body position of the poultry on hooks of the conveyor after removal of the viscera leads to the problem that substances accidentally spilling out of the viscera, such as stomach contents, bile, contents of the intestines or the like, can fall onto the carcass or into the belly cavity and contaminate it, a large part of the carcass lying lower down than the viscera package hanging from the bird.

SUMMARY OF THE INVENTION

The object of the invention is to make a considerable improvement in the mechanical removal of the viscera from the belly cavity of slaughtered poultry, in particular the hygiene thereof, and in the carrying out of subsequent operations on the poultry.

This object is attained according to the invention by tilting the body of the poultry during the removal of the viscera to a second position, in which the shoulder joints are situated at essentially the same height as or higher up than the hip joints.

Partially or completely removed viscera in the second position of the body of the poultry according to the invention will always be situated lower down than the bird, so that any substances such as faces, stomach contents, bile, etc., leaking from viscera cannot reach the carcass, and therefore cannot contaminate it.

The body is preferably held tilted in the second position at least until the viscera are hanging free out of the belly cavity, because it is precisely during the last stage of the removal of the viscera from the belly cavity of the poultry that drawing means of the drawing device exert the greatest compressive force on the viscera package and there is the greatest likelihood of harmful substances escaping from it.

According to a preferred implementation, the second position of the body after removal of the viscera from the belly cavity is maintained during the veterinary inspection of the poultry, cleaning of the viscera or removal of one or more organs from the viscera. The position of the body of the poultry reached according to the invention during drawing makes, for example, an inspection of the viscera, the carcass or the belly cavity of the poultry by the veterinary inspector particularly easy to carry out without direct contact with the poultry in the very limited time which is available with the usually high speeds of conveyance. The tilting can be towards the back or the belly side of the poultry, depending on the kind of poultry and the design and mode of operation of the drawing tool.

In the case of the tilting of the poultry according to the invention, the tilting axis can expediently be found near or at the point where the legs are suspended from the hooks of the conveyor. In this case it is an advantage if the legs are situated one after the other, viewed in the direction of conveyance of the conveyor, since the poultry can then be tilted at right angles to the direction of conveyance, so that there is no obstruction by poultry hanging near-by in the conveyor.

A particularly advantageous implementation of the method according to the invention is obtained if at least a part of the neck of the poultry is guided from a position lower down than the legs to a position in which the neck is situated essentially at the same height as or higher up than the legs and the body of the poultry extends between the neck and the legs. A very well-defined tilting of the body of the poultry can be obtained in this way, with the carcass of the poultry being suspended at three points lying in one plane.

A device according to the invention comprises body tilting means which are designed to tilt the body to a second position, in which the shoulder joints are situated at essentially the same height as or higher up than the hip joints. The body tilting means can be achieved in many different ways and, for example, can comprise a guide face over which the body of the poultry is dragged until it takes up the second position, supports which tilt relative to the hooks and engage on the body and tilt it, etc.

In the same way as was pointed out already above in connection with the time of tilting, the body tilting means are designed to hold the body tilted in the second position at least until drawing means of the drawing device have removed the viscera from the belly cavity of the birds and the viscera are hanging free out of the belly cavity. It is particularly advantageous to design the body tilting means to maintain the second position of the body after the removal of the viscera from the belly cavity during the veterinary inspection of the poultry, cleaning of the viscera, or removal of one or more organs from the viscera. The above-mentioned drawing means are known in many variants, for example in the form of a scoop whose movement is controlled for scooping the viscera out of the poultry.

It is preferable to use body tilting means which can be moved in synchronism with the conveyor, because this ensures a good position of the carcasses. In the case of body tilting means which do not move in synchronism with the conveyor, such as a guide track for the body of the poultry, there is in fact a risk of the body lagging behind the moving suspension from the hooks of the conveyor and the drawing means not being able to fulfill their function in an optimum manner.

If the legs of the poultry are situated after one another, viewed in the direction of conveyance, in the hook of the conveyor, the body tilting means can tilt the body about a line through the suspension points of the legs on the hooks, in which case the advantages already explained are achieved.

In a preferred embodiment the body tilting means comprise neck carrier means for guiding at least a part of the neck of the poultry along a path extending from an area lower down than the legs to an area essentially at the same height as or higher up than the legs, in which case neck, body and legs lie virtually in line with one another.

Such neck carrier means can comprise, for example, at least two parallel guide rails with a distance between them which is smaller than the thickness of the head of the poultry, along which guide rails carrier elements can be moved in synchronism with the conveyor.

In another preferred embodiment which is simpler in design, the neck carrier means comprise at least one guide rail, along which guide rail carrier elements can be moved in synchronism with the conveyor, which carrier elements are provided at the rear side, viewed in the direction of conveyance, with a notch of such dimensions that a notch in conjunction with the guide rail bounds an opening which is smaller than the thickness of the head of the bird.

The carrier elements are preferably fixed at certain intervals on an endless chain which can be moved parallel to the guide rail(s).

Through the use of neck carrier means, the neck of the bird is situated at a very well-defined place at each moment, and this fact can be used when separating the head from the body of the poultry in the neck region by providing the neck carrier means with separating means at the end of their working path.

The claims and advantages will be more readily appreciated as the same becomes better understood by reference to the following detailed description and considered in connection with the accompanying drawings in which like reference symbols designate like parts.

BRIEF DESCRIPTION OF THE DRAWINGS

FIG. 1 shows a partial cross-section of a conveyor with a hook from which a slaughtered bird is hanging in a vertical position;

FIG. 2 shows the bird of FIG. 1 after the removal from it of the viscera, and hanging by the legs and the neck in a position in which the back faces downwards and the shoulder joints of the bird are higher up than the hip joints;

FIG. 6 shows a cross-section of the tilting means along the line VI—VI in FIG. 5, and a bird tilted with the tilting means;

FIG. 7a shows a side view of carrier elements of the tilting means;

FIG. 7b shows a front view of carrier elements of the tilting means; and

DESCRIPTION OF THE PREFERRED EMBODIMENT

Figure 3:
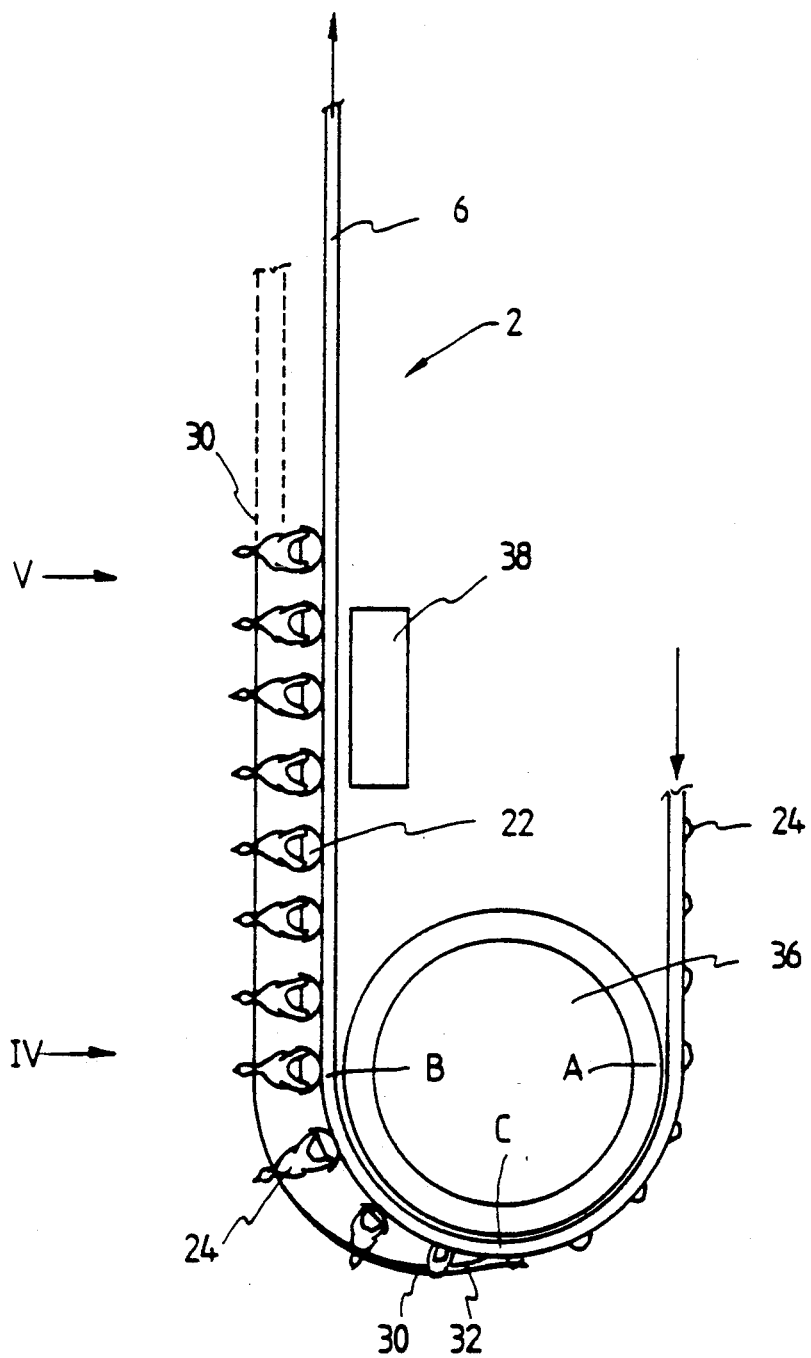
FIG. 3 schematically shows a top view of the device according to the invention.

FIG. 1 shows a conveyor 2, comprising a frame which is made up of beams 4, 6, 8 and 10. The beam 10, shown partially in cross-section, has a T-shaped section on which the wheels 12, supported on the ends of a fork-shaped carrier 14, can roll on the top side of the flanges projecting laterally in opposite directions. On the underside of the carrier 14 an end of a rod 16 is supported so that it can rotate about a shaft 18. At the bottom end of the rod 16 a second pivot shaft 20 is fitted at right angles to the shaft 18, about which shaft 20 the top end of a hook 22 can pivot. The hook 22 is shaped in such a way that a slaughtered bird 24, such as a chicken, a turkey, a duck or the like, can be suspended from it by its tarsal joints.

FIGS. 1 and 2 differ from each other in two respects: in the first place, compared with the position shown in FIG. 1, the bird 24 in FIG. 2 is tilted through more than 90° about the shaft 20, and in the second place the viscera package 26 of the bird 24 in FIG. 2 has been removed from the belly cavity of the bird 24, unlike the situation shown in FIG. 1. The position of the bird 24 shown in FIG. 2, in which the shoulder joints are at a higher position than the hip joints, is achieved through the fact that during conveyance of the bird 24 in the conveyor 2 the neck 28 of the bird is guided between elongated guide rails 30 and 32, which guide rails run essentially parallel to each other at such a distance that the neck 28 can slide between them, but the head 34 of the bird 24 cannot pass through the opening between the guide rails 30 and 32. The guide rails 30 and 32 extend from the position lower down than the pivot shaft 20, shown in FIG. 1, to the position higher up than the pivot shaft 20 shown in FIG. 2. The conveyance of the bird 24 on the hook 22 in the conveyor 2 thus produces a tilting of the bird 24 from the position hanging vertically shown in FIG. 1 to the tilted position shown in FIG. 2. While it is making this transition, the viscera 26 are removed from the bird 24 using conventional drawing means which are not shown, it being ensured that when the viscera 26 emerge from the belly cavity of the bird 24 the bird is for the most part in the position shown in FIG. 2. In the position of the bird 24 shown in FIG. 2 any substances spilling out of the viscera 26 cannot reach the carcass, with the result that contamination of the carcass is out of the question. The guide rails 30 and 32 continue in the position shown in FIG. 2 on further conveyance of the bird 24 by the conveyor 2, so that, for example, an inspection of the viscera 26 and the carcass by a veterinary inspector is particularly easy to carry out.

FIG. 3 shows the contour of an only very schematically shown drawing device 36 of the carrousel type, along which slaughtered poultry hanging in the conveyor 2 is conveyed in the direction of the arrows. The drawing device 36 can be of a conventional, generally known type and has drawing means (not shown in further detail) for removing the viscera package from the belly cavity of the birds while the birds 24 are passing along the device. This drawing operation begins at an infeed point A along the periphery of the drawing device 36 and is completed near outfeed point B on the periphery of said device. In this case, during the journey of the birds 24 between the point A and a point C, a drawing tool is inserted into the belly cavity of the poultry, following which in the course of the passage between the points C and B this tool takes the viscera to an opening of the carcass, and the viscera are removed as a package from the carcass near point B.

The guide rails 30 and 32 already shown in FIGS. 1 and 2 ensure that particularly during the passage from point C to point B the birds 24 are tilted from the position shown in FIG. 1 to the position shown in FIG. 2, which latter position after leaving point B on the periphery of the drawing device 36 is maintained during further conveyance of the birds 24 by the conveyor 2. While passing an inspection station 38, which is shown only schematically and is known per se, the birds 24 can then be extremely well visually inspected by a veterinary inspector. In the position then reached by the bird 24, shown in FIG. 2, the viscera package 26 hanging out and the belly cavity are in particular in an excellent position for inspection or for having operations carried out on them, such as cleaning or the removal of one or more organs from the package.

FIGS. 4–8 show different views and parts of an embodiment of elements of the device according to the present invention shown only schematically or in principle in the previous figures. As FIGS. 6, 7a and 7b show most clearly, the neck 28 of the bird 24 is guided between a guide rail 30, as described above, and a section 40 placed parallel thereto at a slight distance, which distance is sufficient for the neck of the bird to pass through, but is too small for the head 34 of the bird to pass through. A guide rail 42 is placed parallel to the guide rail 30, in such a way that there is a longitudinal guide between the rails 30 and 42 for carrier elements 44. As shown more clearly in FIGS. 7a and 7b, these carrier elements 44 are fixed on links 46 of an endless chain, which links can move through the guide rail 40. The chain with the links 46 is driven by means of a toothed wheel 48 at such a speed that the neck 28 of the bird 24 moves essentially in synchronism with the legs moved by the conveyor 2, for example by coupling the drive of the toothed wheel 48 by means of a right angle drive 50 with a suitable speed ratio to the drive of the carriers 14 of the conveyor 2. The guide rails 30, 40 and 42 are held in position relative to each other by means of brackets 52 and 54 disposed at regular distances of the rails, which brackets are in turn fixed to a frame 56 which is supported on legs 60 resting on a floor 58.

Figure 4:
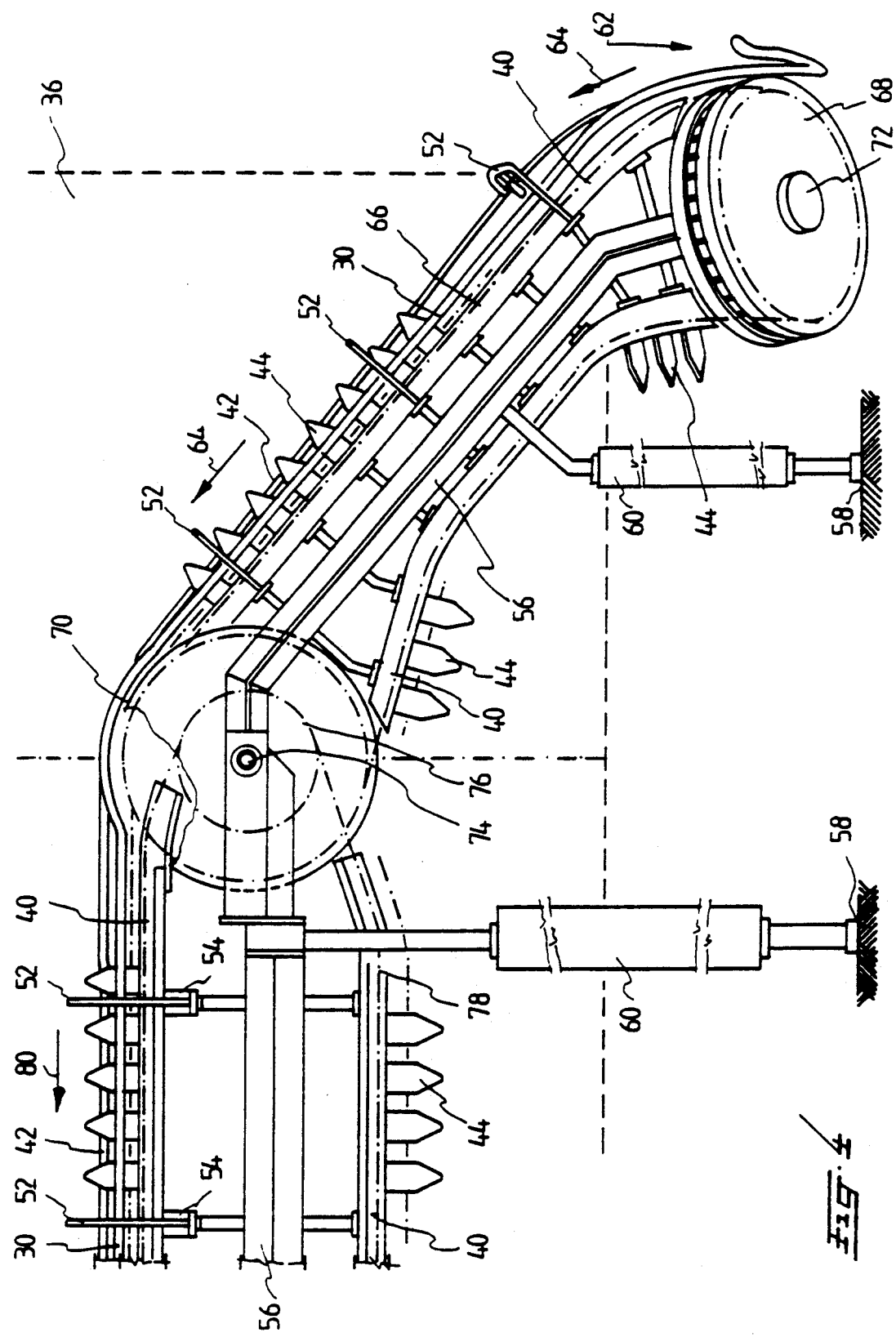
FIG. 4 shows a side view of a righthand part of the tilting means of the device of FIG. 3, in a view in the direction of arrow IV in FIG. 3.

FIG. 4 shows on the righthand side of the figure the part of the device according to the invention which extends along a part of the periphery of the drawing device 36, and in which the body of the bird 24 is tilted from a hanging, vertical position to a position in which the shoulder joints are situated at essentially the same height or higher up than the hip joints. The neck 28 of a bird 24 hanging in the vertical position is gripped for the purpose at the run-in part 62 of the guide rails and pushed forward between guide rails 30 and 40 with the aid of the carrier elements 44 in the direction of the arrows 64. These carrier elements 44 are fixed on a symbolically shown endless chain 66, which chain 66 is guided over two toothed wheels 68 and 70, each rotatable about a shaft 72, 74 respectively. The shaft 72 is driven, in a manner not shown in further detail, in such a way that the carrier elements 44 move in synchronism with the hooks 22 being moved along the drawing device 36 in the conveyor 2. Needless to say, the path of the guide rails 30, 40 and 42 on the righthand side of the figure runs essentially along a part of a helical line.

The shaft 74 further bears a toothed wheel 76 over which an endless chain 78, like the chain 66 provided with carrier elements 44, is guided. The necks 28 of birds 24 guided by the carrier elements 44 of the chain 66 along the toothed wheel 70 are taken over by carrier elements 44 of the chain 78 and carried along further by them in the direction of the arrow 80. The top side of the toothed wheel 70 forms the highest point in the guidance of the neck 28 of a bird 24, and this is also the point at which the position of the bird 24 shown in FIG. 2 is reached.

Figure 5:
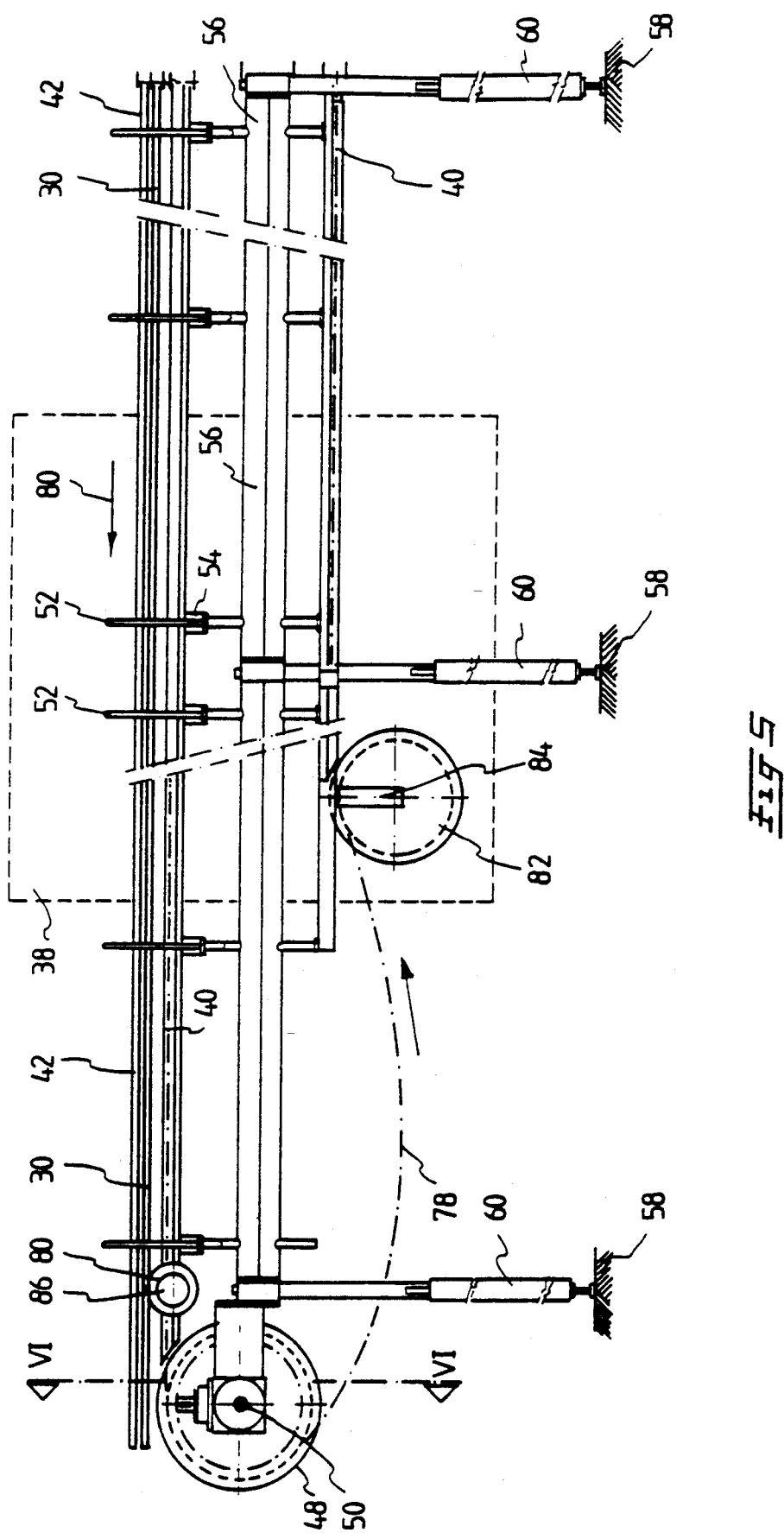
FIG. 5 shows on a smaller scale a side view of a lefthand part of the tilting means of the device of FIG. 3 in a view in the direction of arrow V in FIG. 3.

FIG. 5 shows the part of the tilting means extending on the left side of the tilting means shown in FIG. 4 and integral therewith. In FIG. 5 the position of the inspection station 38 mentioned earlier, which is known per se and need not be discussed in any further detail here, is indicated by dashed lines. FIG. 5 also shows a guide wheel 82 in the return path of the chain 78 provided with carrier elements 44, which guide wheel 82 is rotatably mounted in strips 84 connected to the frame 56. A rotary knife 88 driven by a motor 86 is disposed near the point where the neck 28 of a bird 24 leaves the guide between the guide rails 30 and 40, for separating the head from the body of the poultry in the neck region. The poultry will consequently fall from the tilted position back to the hanging, vertical position. In order to continue preventing contamination of the carcass—carefully avoided up to that point—from substances coming out of the viscera package, the viscera package can be kept separated from the carcass by placing a mechanical partition or the like between them until the viscera package has been removed completely.

Figure 8:
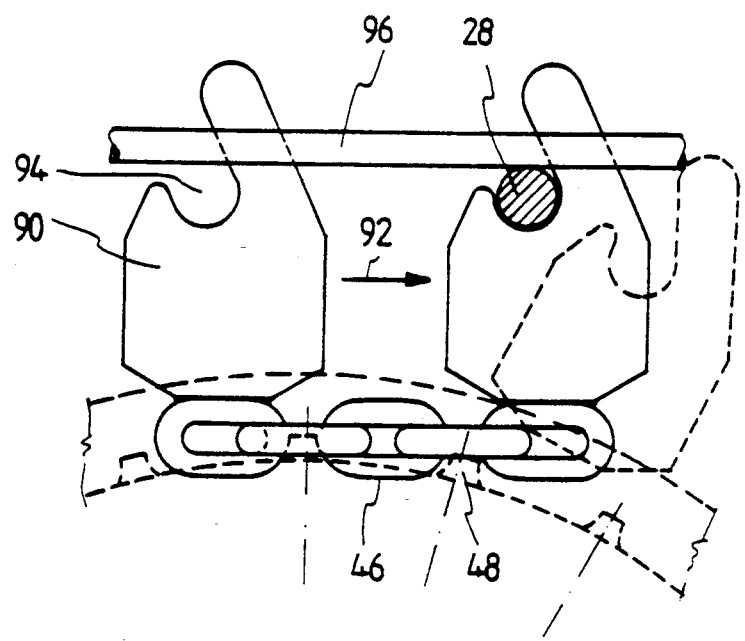
FIG. 8 shows another embodiment of carrier elements of the tilting means.

FIG. 8 shows carrier elements 90 which at the rear side, viewed in the direction of movement 92, are each provided with a notch 94.

A part of a guide rail 96 corresponding to the guide rails 30 or 42 shown in FIGS. 4–6 is also shown in the figure. The guide rail 96 and the carrier elements 90 interacting with it in the region of the notches 94 bound openings which have a cross-section which is adapted to the cross-section of a neck 28 of a bird, but is smaller than the cross-section of a head 34 of a bird. It is thus possible to confine the neck of a bird in one of the above-mentioned openings, in order to carry it along for tilting of the bird.

At the run-in side of the tilting means the path of the guide rail 96 and the path of the carrier elements 90 can converge for gradually confining the neck 28 of a bird, while at the discharge side the path of the guide rail 96 and the path of the carrier elements 90 can diverge, with the result that the neck is released again, with or without the additional effect of a stop provided along the path of the carrier elements which presses the neck out of the notch 94 of the corresponding carrier element.

While the invention has been described and illustrated in its preferred embodiment, it should be understood that departures may be made therefrom within the scope of the invention, which is not limited to the details disclosed herein.

What is claimed is:

1. A method for mechanical removal of the viscera from the belly cavity of slaughtered poultry hanging by the legs from hooks which are moved in a conveyor along a drawing device, the method comprising the step of tilting, during removal of the viscera, the body of the poultry from a hanging, vertical position through a predetermined angle about an axis running essentially parallel to a line through the hip joints, to a second position, in which the shoulder joints are situated at a height essentially at least as high as the hip joints.

2. A method according to claim 1, wherein the body is held tilted in the second position at least until the viscera are hanging free out of the belly cavity.

3. A method according to claim 1, wherein after removal of the viscera from the belly cavity the second position of the body is retained during the veterinary inspection of the poultry, cleaning of the viscera or removal of one or more organs from the viscera.

4. A method according to claim 1, wherein the legs are situated after one another, viewed in the direction of conveyance.

5. A method according to claim 1, wherein at least a part of the neck of the poultry is guided from a position lower down than the legs to a position in which the neck is situated essentially at the same height or higher up than the legs and the body of the poultry extends between the neck and the legs.

6. A device for mechanical removal of the viscera from the belly cavity of slaughtered poultry, comprising a drawing device having an infeed position and an outfeed position, a conveyor with hooks from which the poultry can be suspended by the legs and with which the poultry can be moved along the drawing device from the infeed position to the outfeed position and also body tilting means positioned adjacent the drawing device between the infeed and outfeed positions to cooperate with the drawing device for tilting the body of the poultry during removal of the viscera from a hanging, vertical position through a predetermined angle about an axis essentially parallel to a line running through the hip joints, in which the shoulder joints are situated essentially at least as high as the hip joints.

7. A device according to claim 6, wherein the body tilting means are designed to hold the body tilted in the second position at least until drawing means of the drawing device have removed the viscera from the belly cavity of the poultry and the viscera are hanging free out of the belly cavity.

8. A device according to claim 6, wherein the body tilting means are designed to maintain the second position of the body, after removal of the viscera from the belly cavity, during the veterinary inspection of the poultry, the cleaning of the viscera, or the removal of one or more organs from the viscera.

9. A device according to claim 6, wherein the body tilting means can be moved in synchronism with the conveyor.

10. A device according to claim 6, wherein the legs are situated after one another, viewed in the direction of conveyance, in the hooks of the conveyor.

11. A device according to claim 6, wherein the body tilting means comprise neck carrier means for guiding at least a part of the neck of the poultry along a path extending from a region lower down than the legs to a region essentially at the same height as or higher up than the legs, in which case the neck, body and legs are substantially in line with one another.

12. A device according to claim 11, wherein the neck carrier means comprise at least two parallel guide rails with a distance between them which is smaller than the thickness of the head of the poultry, along which guide rails carrier elements can be moved in synchronism with the conveyor.

13. A device according to claim 11, wherein the neck carrier means comprise at least one guide rail, along which guide rail carrier elements can be moved in synchronism with the conveyor, which carrier elements at the rear side, viewed in the direction of movement, are each provided with a notch of such dimensions that a notch in conjunction with the guide rail bounds an opening which is smaller than the thickness of the head of the poultry.

14. A device according to claim 12, wherein an endless chain can be moved parallel to the guide rail(s), on which chain the carrier elements are fixed at certain intervals.

15. A device according to claim 11, wherein the neck carrier means at the end of their working path are provided with separation means for separating the head from the body of the poultry in the neck region.

* * * * *